United States Patent [19]

Lewis

[11] Patent Number: 5,265,902
[45] Date of Patent: Nov. 30, 1993

[54] VEHICLE SUSPENSION MEMBER

[76] Inventor: Roy A. Lewis, 119 N. Second St., West Branch, Iowa 52358

[21] Appl. No.: 840,947

[22] Filed: Feb. 25, 1992

[51] Int. Cl.⁵ .............................................. B62D 17/00
[52] U.S. Cl. ................................. 280/666; 280/696; 280/692
[58] Field of Search ............... 280/666, 696, 701, 692; 267/220, 248, 255, 34, 221, 222

[56] References Cited

U.S. PATENT DOCUMENTS

| | | | |
|---|---|---|---|
| 3,039,788 | 6/1962 | Farago . | |
| 3,727,940 | 4/1973 | Hug | 280/692 |
| 3,830,482 | 8/1974 | Norris . | |
| 3,940,160 | 2/1976 | Damon | 280/696 X |
| 3,940,161 | 2/1976 | Allison | 280/666 X |
| 3,941,401 | 3/1976 | Allison | 280/692 X |
| 4,575,058 | 3/1986 | Daraz . | |
| 5,005,855 | 4/1991 | Lee | 280/666 X |

FOREIGN PATENT DOCUMENTS

| | | | |
|---|---|---|---|
| 3434636 | 5/1986 | Fed. Rep. of Germany | 280/666 |
| 275664 | 5/1951 | Switzerland | 280/666 |

Primary Examiner—Joseph D. Pape
Attorney, Agent, or Firm—G. Brian Pingel

[57] ABSTRACT

A suspension member for a frame of a vehicle that permits a coil spring and a shock absorber to be attached as a unit to the vehicle frame and a control arm pivotally attached to the frame. The control arm is attached to the frame so that the suspension member extends between the frame and the control arm, and the coil spring and shock absorber can be adjusted concurrently.

10 Claims, 2 Drawing Sheets

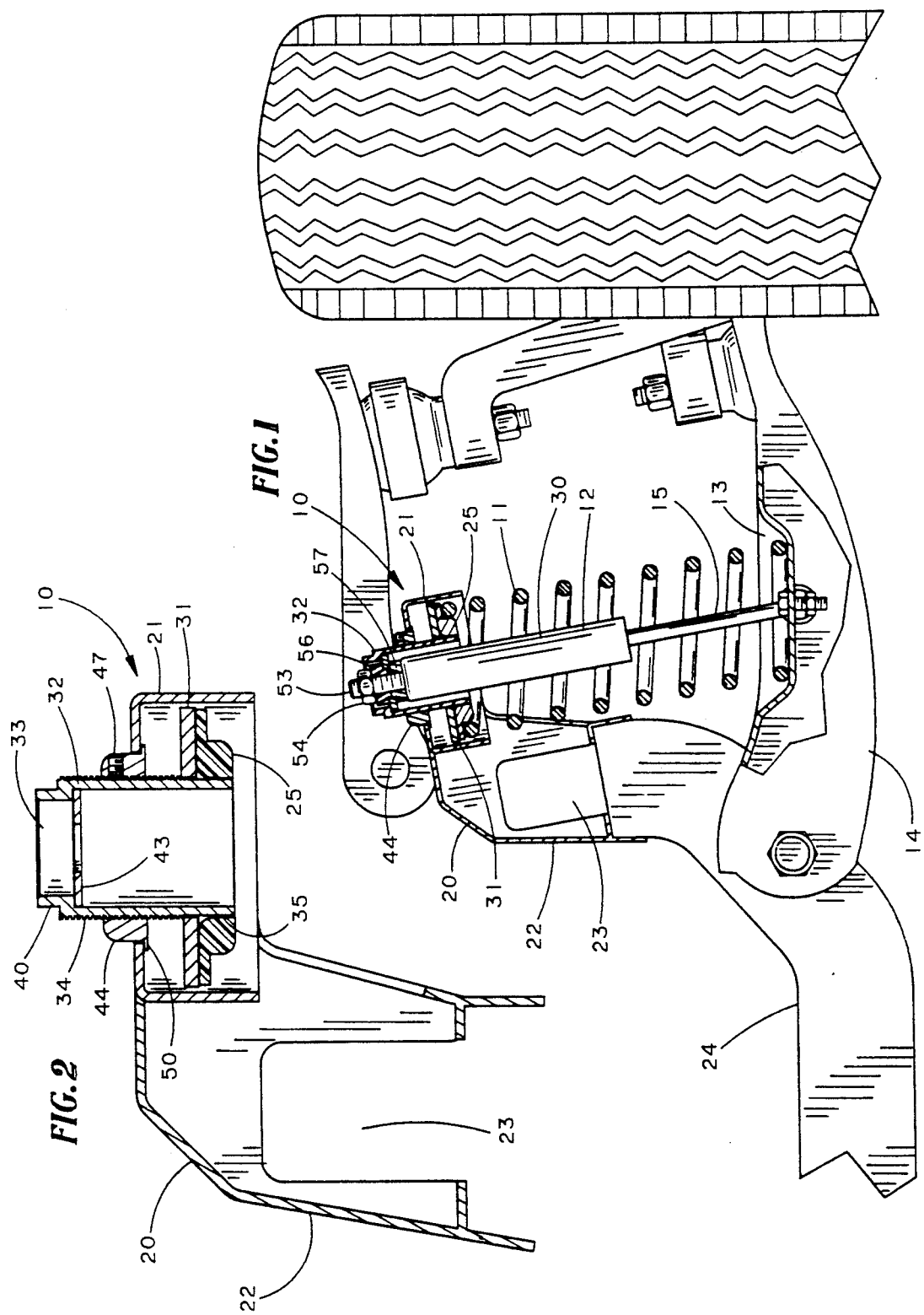

VEHICLE SUSPENSION MEMBER

BACKGROUND OF THE INVENTION

1. Field of the Invention

The present invention relates in general to a suspension member for a frame of a vehicle and more specifically concerns a suspension member that includes a coil spring and a shock absorber as a unit.

2. Description of the Prior Art

It is generally known to use coil-type suspension springs and shock absorbers for providing suspension of a vehicle frame. In standard configurations, the suspension spring and shock absorber are spaced apart from one another and height adjustment or removal thereof must be done on an individual basis or with a shock mounted inside the spring and adjustment is provided for the spring only.

It is also known to include means that coact with the suspension spring to permit adjustment thereof as needed. For example, in U.S. Pat. No. 3,039,788 to Farago, a coil spring is disclosed as being mounted in connection with a thrust rod element that extends upwardly through the coil spring and secures the spring to an upper control arm. The thrust rod element is designed to be adjustable to vary the compression of the coil spring as is done in the present invention. However, Farago does not include a unitary structure composed of a coil spring and a shock absorber. U.S. Pat. No. 3,830,482 issued to Norris also discloses an adjustable coil spring structure. Again this structure differs from the present invention as it does not include a unitary shock absorber.

U.S. Pat. No. 4,575,058 issued to Daraz discloses a vari-torque bar shock absorber that is comprised of a structure having a number of coil springs. However, the coil springs are designed as part of the shock absorber in a complex fashion that is far different from the simplistic construction of the present invention.

SUMMARY OF THE INVENTION

The present invention provides a suspension member for a frame of a vehicle having means for attaching a coil spring and a shock absorber as a unit to permit adjustment thereof. The suspension member includes a mounting means with a threaded opening, an adjustable means having both a threaded shaft portion that coacts with the mounting means and a spring seat for one end of the coil spring, and attachment means associated with the adjustable means for attaching one end of the shock absorber thereto so that as the position of the adjustable means is varied with respect to the mounting means, the shock absorber and coil spring are adjusted concurrently.

The mounting means is formed of a mounting member having an open center and a circularly shaped downwardly extending flange that serves as an outer retaining wall for the coil spring, and a collar portion secured in the open center. The collar portion includes an internally threaded opening that is concentric with the open center of the mounting member. The adjustable means includes a shaft portion having exterior threads for coacting with the collar portion so that the position of the adjustable means can be varied with respect to the collar portion.

BRIEF DESCRIPTION OF THE DRAWINGS

FIG. 1 is a cross-sectional view of a preferred embodiment of the present invention assembled in association with a shock absorber and a coil spring that are disposed between a vehicle frame and a lower control arm as a unit;

FIG. 2 is an enlarged cross-sectional view of the suspension member of FIG. 1;

DETAILED DESCRIPTION OF THE PREFERRED EMBODIMENT

Figure 3:
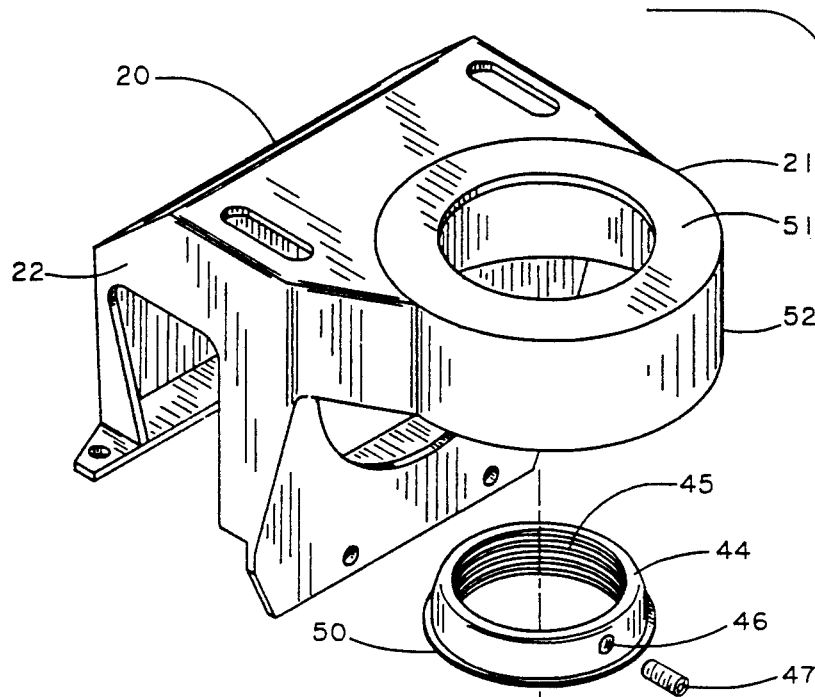
FIG. 3 is an exploded perspective view of the suspension member of FIG. 1.

Referring first to FIG. 1, the present invention provides an improved automobile suspension adjustment member. A preferred embodiment of the adjustment member of the invention is shown generally at 10. By utilizing the adjustment member 10, the tension of both a standard type automobile suspension coil spring 11 and shock absorber 12 may be varied simultaneously. The present invention further improves upon suspension systems currently used in that the adjustment member 10 allows the shock absorber 12 to be located within the inner cavity of the spring 11, thereby permitting them to operate as a single unit.

In the preferred embodiment, the lower end of the spring 11 rests on a lower spring seat 13 which is located in the upper middle section of a lower control arm 14. The lower end of a rod portion 15 of the shock absorber 12 is pivotally secured to the middle of said lower spring seat 13.

FIG. 2 shows the adjustment member 10 having a mounting member 20. The mounting member 20 is generally comprised of a shoulder 21 and a socket 22. The shoulder 21 provides a preferable means for housing the upper ends of the shock absorber 12 and the spring 11, while the socket 22 provides a means to secure the adjustment member 10 onto a side rail 23 of an automobile frame 24, as depicted in FIG. 1. It should be noted, however, that while this particular configuration of the mounting member 20 is the preferred method for securing the adjustment member 10 to the side rail 23, there are many other methods which are well known in the art that can perform this same function.

FIG. 3 shows, in an exploded perspective fashion, the primary elements of the adjustment member 10. Starting at the bottom of FIG. 3, an upper spring seat 25 is shown having a washer shaped base 26 and a downwardly protruding inner section 27. The outer diameter of the base 26 is slightly larger than the cross sectional diameter of the spring 11 so that when the spring 11 is seated, the uppermost convolution will rest entirely on the lower surface of the flat base 26. The inner diameter of the base 26 is sized to allow a chamber section 30 of the shock absorber 12 to pass freely through. Preferably, the upper spring seat 25 is made of a rubber composite material which provides for a more receptive surface for the spring 11.

The next element shown is a spring retaining member 31 which is also washer shaped and has inner and outer diameters which match those of said upper spring seat 25.

A generally cylindrical shaped, elongated adjustable nut 32 is shown having an open center bore 33 and an exteriorly threaded shaft section 34. A smooth lower mating section 35 extends downward from the last thread and is sized to permit the spring retaining member 31 to slide onto the mating section 35 and be secured thereon just below the last thread. The upper spring seat 25 may then be slid onto the mating section 35 with its inner section 27 extending downward until it abuts against the spring retaining member 31.

The adjustable nut 32 also has a square shaped head section 40 with the corners rounded and threaded to correspond with the threads of the shaft portion 34. The square shaped head section 40 provides a preferable surface for turning the adjustable nut 32. However, any configuration such as a hex shaped head may be used so long as it provides a surface which will mate with common mechanic tools required to turn the nut 32.

Figure 4:
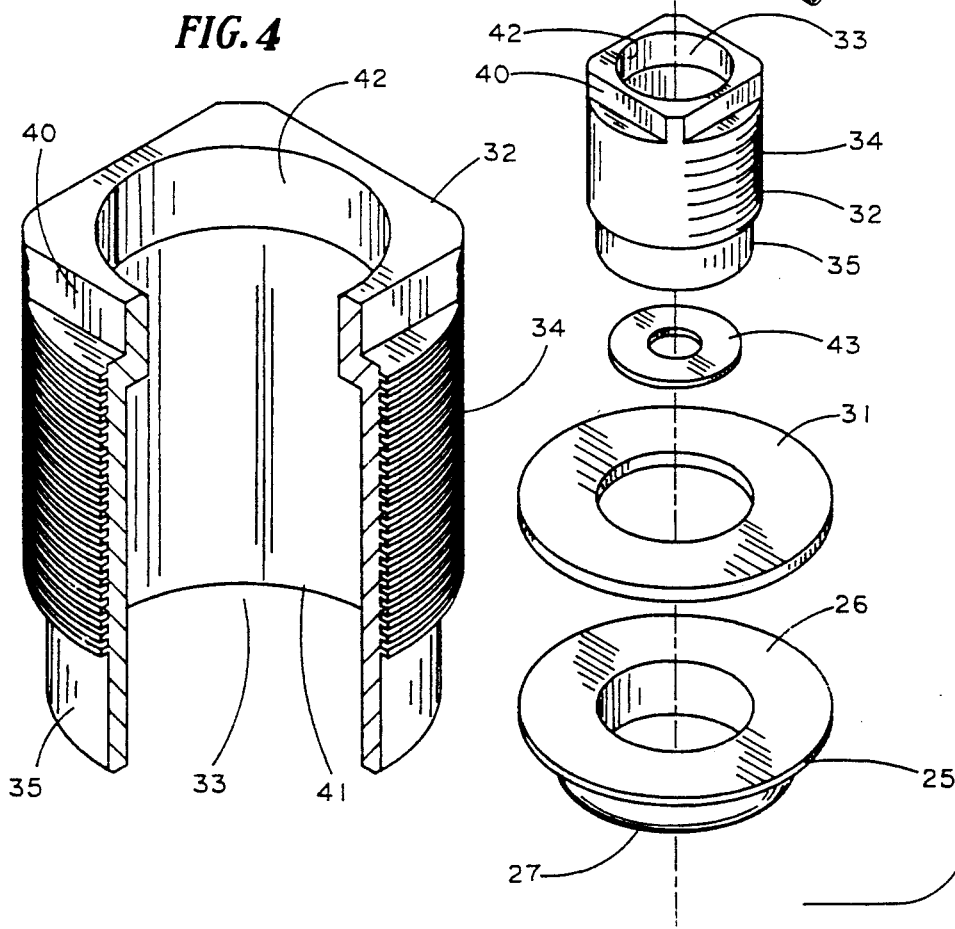
FIG. 4 is an enlarged perspective view of an adjustable nut that forms a portion of the suspension member of FIG. 1 and having a portion cut away for purposes of disclosing interior construction.

As shown in FIG. 4, the open center bore 33 is comprised of a lower bore portion 41 and a stepped up portion 42 which has a smaller cross-sectional diameter than that of the lower bore portion 41. Referring again to FIG. 3, a washer shaped shock retaining member 43 having an outer diameter slightly smaller than the diameter of said lower bore portion 41 is rigidly secured within the open center bore at the step located between the lower bore portion 41 and the stepped up portion 42. The purpose of the shock retaining member 43 is described in detail later.

A lock collar 44 is shown next and has a threaded cavity 45 which is sized to mate with shaft section 34 of the adjustable nut 32. Perpendicular to the cavity 45 and intersecting with it is a tapped hole 46 for receiving a lock screw 47. A lip portion 50 circumferences the outer bottom edge and is used to secure the lock collar 44 within the shoulder 21.

The shoulder 21 is comprised of a disk shaped upper end 51 and a cylindrical wall 52 which is perpendicular to and extends downward from said end 51. This shoulder configuration provides a cap for the upper section of the spring 11, thereby retaining the spring 11 on the upper spring seat 25.

The lock collar 44 is secured to the shoulder 21 by inserting the collar 44 up through the shoulder 21 and into the open center of the upper ring 51 until the lip portion 50 catches the ring 51. The collar 44 is then rigidly secured, as by welding, at this point in a manner so the tapped hole 46 is fully exposed.

Referring back to FIG. 1, the chamber 30 of the shock absorber 12 is shown in its normal position with its upper portion located within the adjustable nut 32. When the chamber 30 is inserted into the nut 32, a threaded neck 53 extending upwardly from the chamber 30 passes through the open center of the retaining member 43. A common type hex nut 54 is mated with the neck 53 to rigidly secure the chamber 30 within the adjustable nut 32. Rubber bushings 56 and 57 are disposed on the neck 53 on opposite sides of the retaining member 43 to provide a flexible connection of the shock absorber 12 to the mounting member 20.

With the shock absorber chamber 30 secured in the adjustable nut 32, the shock absorber rod 15 secured to the lower spring seat 13, and the spring 11 seated between the upper and lower spring seats, 25 and 13, the adjustable nut 32 may then be turned within the lock collar 44 and thereby raise or lower the upper position of both the spring 11 and shock absorber 12. This raising and lowering results in a change in the tension of the spring 11. Once the adjustable nut 32 is turned to a desired location, the lock screw 47 may be then tightened so that the adjustable nut 32 becomes locked at the desired position.

Thus, the present invention provides both a relatively simplistic method for adjusting the tension of an automobile suspension spring 11 and it allows both the spring 11 and a shock absorber 12 to operate as a single unit. Although a specific preferred embodiment has been shown and described herein, it should be noted by those skilled in the art that modifications and variations may be made to such embodiment without departing from the true spirit and scope of the present invention.

I claim:

1. A suspension member for a frame of a vehicle, said member includes a coil spring and a shock absorber attached together as a unit to permit adjustment thereof and comprises:
   (a) mounting means having an internally threaded opening;
   (b) a generally cylindrical shaped adjustable means having, an open center bore, a shaft portion with exterior threads for coacting with said mounting means and a spring seat to serve as an abutment member for one end of said coil spring;
   (c) attachment means associated with said adjustable means for attaching one end of said shock absorber thereto so that as the position of said adjustable means is varied with respect to said mounting means, the shock absorber and coil spring are adjusted concurrently.

2. A suspension member as recited in claim 1 wherein a control arm is pivotally attached to said frame and said suspension member permits said spring and said shock absorber to extend between the frame and the control arm.

3. A suspension member as recited in claim 2 wherein an opposite end of said shock absorber is attached to said control arm.

4. A suspension member as recited in claim 2 wherein an opposite end of said coil spring abuts against said control arm.

5. A suspension member as recited in claim 1 wherein said mounting means comprises:
   (a) a mounting member having an open center and a circularly shaped downwardly extending flange that serves as an outer retaining wall for said coil spring; and
   (b) a collar portion secured in the open center of said mounting member and includes said internally threaded opening, which opening is concentric with the open center of said mounting member.

6. A suspension member as recited in claim 1 wherein the spring seat of said adjustable means includes a generally disk shaped member secured to the lower end of said adjustable means.

7. A suspension member for the frame of a vehicle, said member includes a coil spring and a shock absorber as a unit to permit adjustment thereof simultaneously and comprises:
   (a) a mounting member having an open center and a circularly shaped downwardly extending flange spaced apart from said open center;
   (b) a collar portion secured in the open center of said mounting member and having an internally threaded center aperture that is concentric with the open center of said mounting member;

(c) a cylindrically shaped adjustable shaft member having exterior threads for coacting with said collar portion;

(d) a spring seat attached to the bottom of said shaft member to serve as an abutment member for one end of said coil spring;

(e) means associated with said shaft member for attaching one end of said shock absorber thereto.

8. A suspension member as recited in claim 7 wherein said mounting member has an outwardly extending shoulder on one side in which said open center is located and an opposite side for attachment to said frame.

9. A suspension member as recited in claim 7 wherein a control arm is pivotally attached to said frame and said suspension mechanism permits said spring and said shock absorber to extend between the frame and the control arm.

10. A suspension member as recited in claim 7 wherein said adjustable shaft member has an upper square end and a lower end with a smooth exterior surface on which said spring seat is secured.

* * * * *